United States Patent [19]
Oda et al.

[11] Patent Number: 5,876,814
[45] Date of Patent: Mar. 2, 1999

[54] METHOD OF PREVENTING A CONTAINER FROM BECOMING COLORED BY THE CONTAINER CONTENTS

[75] Inventors: Yasuhiro Oda; Yoshitsugu Maruhashi, both of Kanagawa, Japan

[73] Assignee: Toyo Seikan Kaisha, Ltd., Tokyo, Japan

[21] Appl. No.: 692,721

[22] Filed: Aug. 6, 1996

[30]     Foreign Application Priority Data

Aug. 11, 1995 [JP] Japan .................................. 7-206264

[51] Int. Cl.$^6$ .............................. B29D 9/00; B65D 65/02
[52] U.S. Cl. ...................... 428/36.7; 428/35.9; 428/35.7; 428/36.91; 428/516; 428/517; 428/518; 428/520; 428/910
[58] Field of Search .................................. 428/35.9, 35.7, 428/36.91, 3, 516, 517, 518, 520, 910, 36.7

[56]     References Cited

U.S. PATENT DOCUMENTS

| 5,218,049 | 6/1993 | Yamamoto et al. ....................... 525/97 |
| 5,221,566 | 6/1993 | Tokoh et al. ........................... 428/34.5 |
| 5,532,030 | 7/1996 | Hirose et al. .......................... 428/35.7 |

*Primary Examiner*—Elizabeth Kemmerer
*Assistant Examiner*—David S. Romeo
*Attorney, Agent, or Firm*—Sughrue, Mion, Zinn, Macpeak & Seas, PLLC

[57]     ABSTRACT

A method of preventing a container from becoming colored by contents of the container in a packaging process comprising filling and sealing colored contents in a packaging container having an inner surface comprising a plastic material and then disinfecting and sterilizing the contents by heat treatment, wherein said inner surface plastic material comprises a thermoplastic resin having a glass transition temperature (Tg) 10° C. or more higher than the temperature of said heat treatment and a coefficient of moisture permeability at 40° C. and 90% RH of 2.0 g.mm/m$^2$.24 hr or less.

9 Claims, 2 Drawing Sheets

METHOD OF PREVENTING A CONTAINER FROM BECOMING COLORED BY THE CONTAINER CONTENTS

FIELD OF THE INVENTION

The present invention relates to a method of preventing a plastic material from becoming colored by the contents of a container in a filling and heat sterilization process comprising disinfecting and sterilizing the container contents by heat treatment.

BACKGROUND OF THE INVENTION

Conventionally, a metal can, a glass bottle and various plastic containers have been used as packaging containers. However, in view of light weight, impact resistance and cost, plastic containers prevail in a variety of applications.

However, even in the field of light packaging using a plastic material, preservability of the contents is an important factor. In order to kill microorganisms or spores, sterilization packaging is widely used. Examples of sterilization packaging include (1) a sterile filling method of heat sterilizing contents outside the container and filling the contents in a package subjected to disinfection treatment, (2) a heat sterilization method of filling contents into a container and then heat sterilizing the contents in a retort or boiling water, and (3) a hot filling method of filling heated contents into a package. Among these sterilization packaging techniques, in view of ease in operation and cost of the apparatus, the heat sterilization method is advantageous.

Popular light packages made of plastic, including flexible packages such as a pouch or a semi-rigid package such as a cup or a tray, comprise an intermediate layer of a metal foil having a gas barrier property and an inner surface layer of a heat sealable resin such as an olefin-base resin.

However, when colored contents are filled in the above-described plastic container and then subjected to heat sterilization, the plastic inner surface layer is often colored by the contents.

Coloring of the plastic inner surface layer by the contents not only involves loss of the dye or flavor component from the contents, but also affects quality and appearance and raises a problem with respect to quality retention. Furthermore, a container having a colored inner surface fails to assure users of the reliability of the package.

SUMMARY OF THE INVENTION

An object of the present invention is to provide a method of preventing an inner surface plastic material of a packaging container from becoming colored by the contents of the container and to assure the quality of the contents in a filling and heat sterilization process.

The present invention provides a method of preventing a container from becoming colored by contents of the container in a packaging process comprising filling and sealing colored contents in a packaging container having an inner surface comprising a plastic material, and then disinfecting and sterilizing the contents by heat treatment, wherein the inner surface plastic material comprises a thermoplastic resin having a glass transition temperature (Tg) 10° C. or more higher than the heat treatment temperature and a coefficient of moisture permeability at 40° C. and 90% RH of 2.0 g.mm/m$^2$.24 hr or less.

DETAILED DESCRIPTION OF THE INVENTION

Figure 1:
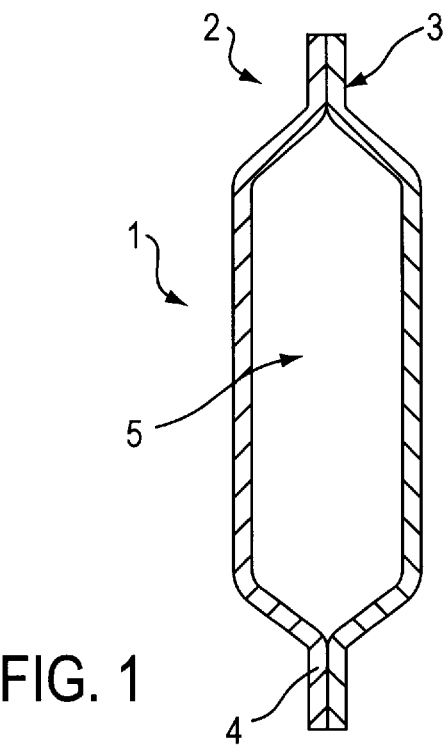
FIG. 1 is a cross section of a packaging container for use in the present invention.

In the present invention, the thermoplastic resin is not particularly limited as long as it has the requisite glass transition point and coefficient of moisture permeability. However, in view of ease in heat sealing, a cyclic olefin-base resin is particularly preferred.

In the present invention, colored contents are filled and sealed in a packaging container having an inner surface comprising a plastic material, and then the contents are sterilized by heat treatment. A characteristic feature of the present invention is the use of a thermoplastic resin having a glass transition temperature (Tg) 10° C. or more higher than the heat treatment temperature, and a coefficient of moisture permeability at 40° C. and 90% RH of 2.0 g.mm/m$^2$.24 hr or less, as the inner surface plastic material.

As a result of investigations on the tendency of the inner surface plastic material to become colored by the contents of the packaging container, the present inventors have discovered that: the plastic inner surface material is colored by the contents during the heat sterilization treatment; coloring of the plastic inner surface material is related to the glass transition point of the plastic material and the heat sterilization temperature, and the coloring intensifies when the glass transition point of the plastic is low and the heat sterilization temperature is high; and when a plastic material having a glass transition point 10° C. or more higher than the heat sterilization temperature is used, coloring by the container contents can be effectively prevented. Furthermore, the present inventors found that when the plastic has a coefficient of moisture permeability within the above-described range, in particular, when an ethylenevinyl alcohol copolymer is used as a gas barrier intermediate layer, the coefficient of moisture permeability is reduced during the heat sterilization treatment. Also, after heat sterilization treatment, the gas barrier property quickly recovers to advantageously increase preservability of the contents.

The degree of coloring of a plastic material before and after heat sterilization treatment can generally be evaluated by measuring the difference in color. For example, a yellow color can be evaluated by the difference in YI values or b values as measured by a color-difference meter before and after heat sterilization treatment. A larger value indicates a greater degree of coloring.

The above-described findings are verified in the Examples described below. Therein, the degree of yellow coloring caused by dipping a plastic sheet sample in curry and heat treating at 100° C. for 30 minutes is shown by the difference in YI values or b values (ΔYI, Δb) as measured by a color-difference meter before and after heat treatment.

According to the results thereof, when polypropylene (Tg=−10° C.) is used as an inner surface material of a plastic package, the ΔYI value is 14.0 and the Δb value is 8.0 which indicates intense coloring. On the other hand, when a cyclic olefin copolymer having a Tg of 135° C. is used, ΔYI is 0.21 and Δb is 0.26 which confirms that the yellow coloring is effectively suppressed. Furthermore, even if the same cyclic olefin copolymer is used but having a glass transition point of 105° C. or lower, the ΔYI value and Δb value are both large which indicates intense yellow coloring. This result is not restricted to olefin-base resins but also applies to other thermoplastic resins. For example, in the case of polyethylene terephthalate (Tg=70° C.), ΔYI is 22.4 and Δb is 13.0 which indicates intense yellow coloring. On the other hand, in the case of polyethylene naphthalate (PEN) having a Tg of 120° C., ΔYI is 0.77 and Δb is 0.55 which indicates that the yellow coloring can be prevented to a considerable extent.

A cyclic olefin copolymer having a Tg of 135° C. has a small coefficient of moisture permeability of 0.10 g.mm/m$^2$.24 hr or less (at 40° C. and 90% RH) and exhibits not only excellent resistance to coloring by contents but also excellent preservability of the contents. This was clearly verified by the results of a sensory test which is described below.

In accordance with a preferred embodiment of the present invention, a cyclic olefin copolymer is used as an inner surface layer of a plastic package material to thereby provide additional advantages. More specifically, because the cyclic olefin copolymer is heat sealable, a heat-sealed portion having excellent sealing performance can be formed by heat sealing at temperatures over a relatively wide range. Also, the cyclic olefin copolymer has excellent extraction resistance relative to the contents. This provides an advantage of superior hygienic properties.

As described in detail above, according to the present invention, advantages in heat sterilization packaging are achieved in that coloring of a plastic inner surface layer by colored contents is prevented and preservability and quality of the contents after sterilization is enhanced.

PREFERRED EMBODIMENTS OF THE INVENTION

Outline Structure of Container

The packaging container for use in the present invention comprises, in view of preservability of contents, a heat resistant resin outer layer, a gas barrier intermediate layer and an inner layer comprising the above-described inner surface plastic material. This container may be a pouch or a rigid or semi-rigid container such as a cup or a tray.

FIG. 1 is a view showing an example of the packaging container for use in the present invention, wherein the container 1 is a pouch container and two flexible laminate sheets 2 and 3 facing each other are heat-sealed in the outer periphery of the container to form a heat seal portion 4 and at the same time an inside housing portion 5.

Figure 2:
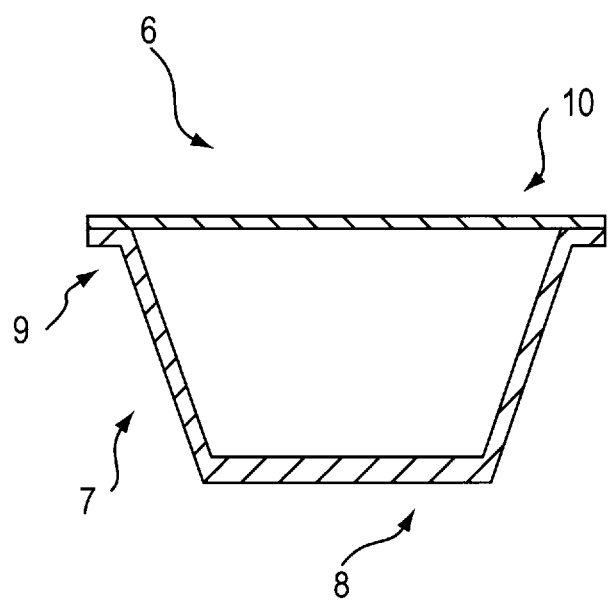
FIG. 2 is a cross section of another packaging container for use in the present invention.

FIG. 2 is a view showing another example of the packaging container for use in the present invention, wherein the container 6 is a cup container formed of a semi-rigid laminate sheet and comprises a tapered barrel portion 7, a closed bottom portion 8 at the lower side of the barrel and a flange portion 9 which extends to the upper part of the barrel portion. The interface between a flexible heat seal cover 10 and the flange portion 9 is hermetically sealed by heat sealing. The flexible heat seal cover is flexible and in addition, has the same layer structure as that of the container described below.

Figure 3:
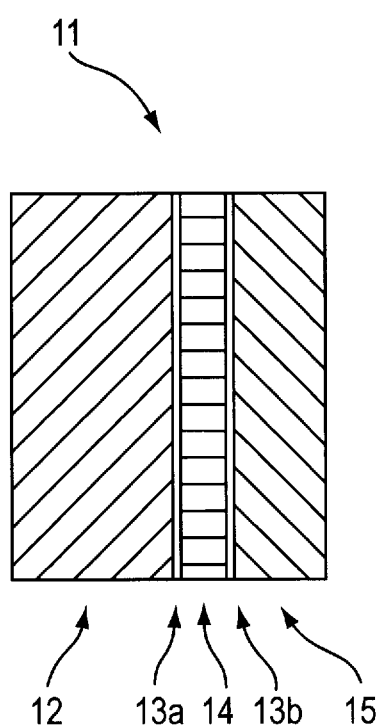
FIG. 3 is a cross-sectional view of a laminate sheet constituting a container.

FIG. 3 is a view showing a cross-sectional structure of a laminate sheet constituting the container, wherein the laminate sheet 11 comprises a heat resistant resin outer layer 12, an adhesive resin layer 13$a$, a gas barrier intermediate layer 14, an adhesive resin layer 13$b$ and an inner layer 15 comprising a specific plastic inner layer material. The inner layer 15 is formed of a thermoplastic resin having a glass transition point 10° C. or more higher than the heat sterilization temperature and a coefficient of moisture permeability at 40° C. and 90% RH of 2.0 g.mm/m$^2$.24 hr or less.

Plastic Inner Layer Material

In the present invention, the plastic inner layer material is preferably a cyclic olefin copolymer satisfying the above-described factors.

The cyclic olefin copolymer (COC) is a noncrystalline or low crystalline copolymer of an olefin with a cyclic olefin. The olefin from which the copolymer is derived is suitably ethylene, but in addition, α-olefins having from 3 to 20 carbon atoms such as propylene, 1-butene, 1-pentene, 1-hexene, 1-octene, 3-methyl-1-pentene and 1-decene may be used individually or in combination.

The cyclic olefin is fundamentally an aliphatic hydrocarbon compound having an ethylenic unsaturated bond and a bicyclo ring, in particular, a hydrocarbon compound having a bicyclo[2,2,1]hept-2-ene skeleton. Specific examples thereof include the following compounds, however, the present invention is by no means limited thereto.

Bicyclo[2.2.1]hept-2-ene derivatives
bicyclo[2.2.1]hept-2-ene,
6-methylbicyclo[2.2.1]hept-2-ene,
5,6-dimethylbicyclo[2.2.1]hept-2-ene,
1-methylbicyclo[2.2.1]hept-2-ene,
6-ethylbicyclo[2.2.1]hept-2-ene,
6-n-butylbicyclo[2.2.1]hept-2-ene,
6-isobutylbicyclo[2.2.1]hept-2-ene, and
7-methylbicyclo[2.2.1]hept-2-ene.
Tricyclo[4.3.0.1$^{2.5}$]-3-decene derivatives
tricyclo[4.3.0.1$^{2.5}$]-3-decene,
2-methyltricyclo[4.3.0.1$^{2.5}$]-3-decene, and
5-methyltricyclo[4.3.0.1$^{2.5}$]-3-decene.
Tricyclo[4.4.0.1$^{2.5}$]-3-undecene derivatives
tricyclo[4.4.0.1$^{2.5}$]-3-undecene, and
10-methyltricyclo[4.4.0.1$^{2.5}$]-3-undecene.
Tetracyclo[4.4.0.1$^{2.5}$.1$^{7.10}$]-3-dodecene derivatives
tetracyclo[4.4.0.1$^{2.5}$.1$^{7.10}$]-3-dodecene
8-methyltetracyclo[4.4.0.1$^{2.5}$1$^{7.10}$]-3-dodecene,
8-ethyltetracyclo[4.4.0.1$^{2.5}$.1$^{7.10}$]-3-dodecene
8-propyltetracyclo[4.4.0.1$^{2.5}$.1$^{7.10}$]-3-dodecene,
8-butyltetracyclo[4.4.0.1$^{2.5}$.1$^{7.10}$]-3-dodecene,
8-isobutyltetracyclo[4.4.0.1$^{2.5}$.1$^{7.10}$]-3-dodecene,
8-hexyltetracyclo[4.4.0.1$^{2.5}$.1$^{7.10}$]-3-dodecene,
8-cyclohexyltetracyclo[4.4.0.1$^{2.5}$.1$^{7.10}$]-3-dodecene,
8-stearyltetracyclo[4.4.0.1$^{2.5}$.1$^{7.10}$]-3-dodecene,
5,10-dimethyltetracyclo[4.4.0.1$^{2.5}$.1$^{7.10}$]-3-dodecene,
2,10-dimethyltteracyclo[4.4.0.1$^{2.5}$.1$^{7.10}$]-3-dodecene,
8,9-dimethyltetracyclo[4.4.0.1$^{2.5}$.1$^{7.10}$]-3-dodecene,
8-ethyl-9-methyltetracyclo[4.4.0.1$^{2.5}$.1$^{7.10}$]-3-dodecene,
11,12-dimethyltethyltetracyclo[4.4.0.1$^{2.5}$.1$^{7.10}$]-3-dodecene,
2,7,9-trimethyltethyltetracyclo[4.4.0.1$^{2.5}$.1$^{7.10}$]-3-dodecene,
2,7-dimethyl-9-ethyletetracycle[4.4.0.1$^{2.5}$.1$^{7.10}$]-3-dodecene,
9-isobutyl-2,7-dimethyltetracyclo[4.4.0.1$^{2.5}$.1$^{7.10}$]-3-dodecene,
9,11,12-trimethyltetracyclo[4.4.0.1$^{2.5}$.1$^{7.10}$]-3-dodecene,
9-ethyl-11,12-dimethyletetracyclo[4.4.0.1$^{2.5}$.1$^{7.10}$]-3-dodecene,
9-isobutyl-11,12-dimethyltetracyclo[4.4.0.1$^{2.5}$.1$^{7.10}$]-3-dodecene,
5,8,9,10-tetramethyltetracyclo[4.4.0.1$^{2.5}$.1$^{7.10}$]-3-dodecene,
8-ethylidenetetracyclo[4.4.0.1$^{2.5}$.1$^{7.10}$]-3-dodecene,
8-ethylidene-9-methyltetracyclo[4.4.0.1$^{2.5}$.1$^{7.10}$]-3-dodecene,
8-ethylidene-9-ethyltetracyclo[4.4.0.1$^{2.5}$.17$^{10}$]-3-dodecene,
8-ethylidene-9-isopropyltetracyclo[4.4.0.1$^{2.5}$.1$^{7.10}$]-3-dodecene,
8-ethylidene-9-butyltetracyclo[4.4.0.1$^{2.5}$.1$^{7.10}$]-3-dodecene,
8-n-propylidenetetracyclo[4.4.0.1$^{2.5}$.1$^{7.10}$]-3-dodecene, 8-n-propylidene-9-methyltetracyclo[4.4.0.1$^{2.5}$.1$^{7.10}$]-3-dodecene,
8-n-propylidene-9-ethyltetracyclo[4.4.0.1$^{2.5}$.1$^{7.10}$]-3-dodecene,
8-n-propylidene-9-isopropyltetracyclo[4.4.0.1$^{2.5}$.1$^{7.10}$]-3-dodecene,
8-n-propylidene-9-butyltetracyclo[4.4.0.1$^{2.5}$.1$^{7.10}$]-3-dodecene,
8-isopropylidenetetracyclo[4.4.0.1$^{2.5}$.1$^{7.10}$]-3-dodecene,
8-isopropylidene-9-methyltetracyclo[4.4.0.1$^{2.5}$.1$^{7.10}$]-3-dodecene,
8-isopropylidene-9-ethyltetracyclo[4.4.0.1$^{2.5}$.1$^{7.10}$]-3-dodecene,
8-isopropylidene-9-isopropyltetracyclo[4.4.0.1$^{2.5}$.1$^{7.10}$]-3-dodecene, and
8-isopropylidene-9-butyltetracyclo[4.4.0.1$^{2.5}$.1$^{7.10}$]-3-dodecene.
Pentacyclo[6.5.1.1$^{3.6}$.0$^{2.7}$.0$^{9.13}$]-4-pentadecene derivatives
P pentacyclo[6.5.1.1$^{3.6}$.0$^{2.7}$.0$^{9.13}$]-4-pentadecene,
1,3-dimethylpentacyclo[6.5.1.1$^{3.6}$.0$^{2.7}$.0$^{9.13}$]-4-pentadecene,
1,6-dimethylpentacyclo[6.5.1.1$^{3.6}$.0$^{2.7}$.0$^{9.13}$]-4-pentadecene, and
14,15-dimethylpentacyclo[6.5.1.1$^{3.6}$.0$^{2.7}$.0$^{9.13}$]-4-pentadecene.
Pentacyclo[7.4.0.1$^{2.5}$.1$^{9.12}$.0$^{8.13}$]-3-pentadecene derivatives
pentacyclo[7.4.0.1$^{2.5}$.1$^{9.12}$.0$^{8.13}$]-3-pentadecene, and
methyl-substituted pentacyclo[7.4.0.1$^{2.5}$.1$^{9.12}$.0$^{8.13}$]-3-pentadecene.
Pentacyclo[6.5.1.1$^{3.6}$.0$^{2.7}$.0$^{9.13}$]-4,10-pentadecadiene derivatives
pentacyclo[6.5.1.1$^{3.6}$.0$^{2.7}$.0$^{9.13}$]-4,10-pentadecadiene.
Pentacyclo[8.4.0.1$^{2.5}$.1$^{9.12}$.0$^{8.13}$]-3-hexadecene derivatives:
pentacyclo[8.4.0.1$^{2.5}$.1$^{9.12}$.0$^{8.13}$]-3-hexadecene
11-methyl-pentacyclo[8.4.0.1$^{2.5}$.1$^{9.12}$.0$^{8.13}$]-3-hexadecene,
11-ethyl-pentacyclo[8.4.0.1$^{2.5}$.1$^{9.12}$.0$^{8.13}$]-3-hexadecene, and
10,11-dimethyl-pentacyclo[8.4.0.1$^{2.5}$.1$^{9.12}$.0$^{8.13}$]-3hexadecene.
Pentacyclo[6.6.1.1$^{3.6}$.0$^{2.7}$.0$^{9.14}$]-4-hexadecene derivatives:
pentacyclo[6.6.1.1$^{3.6}$.0$^{2.7}$.0$^{9.14}$]-4-hexadecene,
1,3-dimethylpentacyclo[6.6.1.1$^{3.6}$.0$^{2.7}$.0$^{9.14}$]-4-hexadecene,
1,6-dimethylpentacyclo[6.6.1.1$^{3.6}$.0$^{2.7}$.0$^{9.14}$]-4-hexadecene, and
15,16-dimethylpentacyclo[6.6.1.1$^{3.6}$.0$^{2.7}$.0$^{9.14}$]-4-hexadecene.
Hexacyclo[6.6.1.1$^{3.6}$.1$^{10.13}$.0$^{2.7}$.0$^{9.14}$]-4-heptadecene derivatives:
hexacyclo[6.6.1.1$^{3.6}$.1$^{10.13}$.0$^{2.7}$.0$^{9.14}$]-4-heptadecene,
12-methylhexacyclo[6.6.1.1$^{3.6}$.1$^{10.13}$.0$^{2.7}$.0$^{9.14}$]-4-heptadecene,
12-ethylhexacyclo[6.6.1.1$^{3.6}$.1$^{10.13}$.0$^{2.7}$.0$^{9.14}$]-4-heptadecene,
12-isobutylhexacyclo[6.6.1.1$^{3.6}$.1$^{10.13}$.0$^{2.7}$.0$^{9.14}$]-4-heptadecene, and
1,6,10-trimethyl-12-isobutylhexacyclo[6.6.1.1$^{3.6}$.1$^{10.13}$.0$^{2.7}$.0$^{9.14}$]-4-heptadecene.
Heptacyclo[8.7.0.1$^{2.9}$.1$^{4.17}$.1$^{11.17}$.0$^{3.8}$.0$^{12.16}$]-5-eicocene derivatives:
heptacyclo[8.7.0.1$^{2.9}$.1$^{4.17}$.1$^{11.17}$.0$^{3.8}$.0$^{12.16}$]-5-eicocene.
Heptacyclo[8.7.0.1$^{3.6}$.1$^{10.7}$.1$^{12.15}$.0$^{2.7}$.0$^{11.16}$]-4-eicocene derivatives:
heptacyclo[8.7.0.1$^{3.6}$.1$^{10.7}$.1$^{12.15}$.0$^{2.7}$.0$^{11.16}$]-4-eicocene, and
dimethyl-substituted heptacyclo[8.7.0.1$^{3.6}$.1$^{10.7}$.1$^{12.15}$.0$^{2.7}$.0$^{11.16}$]-4-eicocene.
Heptacyclo[8.8.0.1$^{2.9}$.1$^{4.7}$.1$^{11.18}$.0$^{3.8}$.0$^{12.17}$]-5-heneicocene derivatives:

heptacyclo[8.8.0.1$^{2.9}$.1$^{4.7}$.1$^{11.18}$.0$^{3.8}$.0$^{12.17}$]-5-heneicocene.
Heptacyclo[8.8.0.1$^{4.7}$.1$^{11.18}$.1$^{13.16}$.0$^{3.8}$.0$^{12.17}$]-5-heneicocene derivatives:
heptacyclo[8.8.0.1$^{4.7}$.1$^{11.18}$.1$^{13.16}$.0$^{3.8}$.0$^{12.17}$]-5-heneicocene,
15-methyl-heptacyclo[8.8.0.1$^{4.7}$.1$^{11.18}$.1$^{13.16}$.0$^{3.8}$.0$^{12.17}$]-5-heneicocene, and
trimethyl-substituted heptacyclo[8.8.0.1$^{4.7}$.1$^{11.18}$.1$^{13.16}$.0$^{3.8}$.0$^{12.17}$]-5-heneicocene.
Octacyclo[8.8.0.1$^{2.9}$.1$^{4.7}$.1$^{11.18}$.1$^{13.16}$.0$^{3.8}$.0$^{12.17}$]-5-dococene derivatives:
octacyclo[8.8.0.1$^{2.9}$.1$^{4.7}$.1$^{11.18}$.1$^{13.16}$.0$^{3.8}$.0$^{12.17}$]-5-dococene,
15-methyloctacyclo[8.8.0.1$^{2.9}$.1$^{4.7}$.1$^{11.18}$.1$^{13.16}$.0$^{3.8}$.0$^{12.17}$]-5-dococene, and
15-ethyloctacyclo[8.8.0.1$^{2.9}$.1$^{4.7}$.1$^{11.18}$.1$^{13.16}$.0$^{3.8}$.0$^{12.17}$]-5-dococene.
Nonacyclo[10.9.1.1$^{4.7}$.1$^{13.20}$.1$^{15.18}$.0$^{2.10}$.0$^{3.8}$.0$^{12.21}$.0$^{14.19}$]-5-pentacocene derivatives:
nonacyclo[10.9.1.1$^{4.7}$.1$^{13.20}$.1$^{15.18}$.0$^{2.10}$.0$^{3.8}$.0$^{12.21}$.0$^{14.19}$]-5-pentacocene, and
trimethyl-substituted nonacyclo[10.9.1.1$^{4.7}$.1$^{13.20}$.1$^{15.18}$.0$^{2.10}$.0$^{3.8}$.0$^{12.21}$.0$^{14.19}$]-5-pentacocene.
Nonacyclo[10.10.1.1$^{5.8}$.1$^{14.21}$.1$^{16.19}$.0$^{2.11}$.0$^{4.9}$.0$^{13.22}$.0$^{15.20}$]-6-hexacocene derivatives:
nonacyclo[10.10.1.1$^{5.8}$.1$^{14.21}$.1$^{16.19}$.0$^{2.11}$.0$^{4.9}$.0$^{13.22}$.0$^{15.20}$]-6-hexacocene.

Other examples of the cyclic olefin include the following compounds:
5-phenyl-bicyclo[2.2.1]hept-2-ene,
5-methyl-5-phenyl[2.2.1]hept-2-ene,
5-benzyl-bicyclo[2.2.1]hept-2-ene,
5-tolyl-bicyclo[2.2.1]hept-2-ene,
5-(ethylphenyl)-bicyclo[2.2.1]hept-2-ene,
5-(isopropylphenyl)-bicyclo[2.2.1]hept-2-ene,
5-(biphenyl)-bicyclo[2.2.1]hept-2-ene,
5-(β-naphthyl)-bicyclo[2.2.1]hept-2-ene,
5-(α-naphthyl)-bicyclo[2.2.1]hept-2-ene,
5-(anthracenyl)-bicyclo[2.2.1]hept-2-ene,
5,6-diphenyl-bicyclo[2.2.1]hept-2-ene,
cyclopentadiene-acenaphthylene adduct,
1,4-methano-1,4,4a,9a-tetrahydrofluorene,
1,4-methano-1,4,4a,5,10,10a-hexahydroanthracene,
8-phenyl-tetracyclo[4.4.0.1$^{2.5}$.1$^{7.10}$]-3-dodecene,
8-methyl-8-phenyl-tetracyclo[4.4.0.1$^{2.5}$.1$^{7.10}$]-3-dodecene,
8-benzyl-tetracyclo[4.4.0.1$^{2.5}$.1$^{7.10}$]-3-dodecene
8-tolyl-tetracyclo[4.4.0.1$^{2.5}$.1$^{7.10}$]-3-dodecene,
8-(ethylphenyl)-tetracyclo[4.4.0.1$^{2.5}$.1$^{7.10}$]-3-dodecene,
8-(isopropylphenyl)-tetracyclo[4.4.0.1$^{2.5}$.1$^{7.10}$]-3-dodecene,
8,9-diphenyl-tetracyclo[4.4.0.1$^{2.5}$.1$^{7.10}$]-3-dodecene,
8-(biphenyl)-tetracyclo[4.4.0.1$^{2.5}$.1$^{7.10}$]-3-dodecene,
8-(β-naphthyl)-tetracyclo[4.4.0.1$^{2.5}$.1$^{7.10}$]-3-dodecene,
8-(α-naphthyl)-tetracyclo[4.4.0.1$^{2.5}$.1$^{7.10}$]-3-dodecene,
8-(anthracenyl)-tetracyclo[4.4.0.1$^{2.5}$.1$^{7.10}$]-3-dodecene,
a compound which is obtained by adding cyclopentadiene to (cyclopentadiene-acenaphthylene adduct),
11,12-benzo-pentacyclo[6.5.1.1$^{3.6}$.0$^{2.7}$.0$^{9.13}$]-4-pentadecene,
11,12-benzo-pentacyclo[6.6.1.1$^{3.6}$.0$^{2.7}$.0$^{9.14}$]-4-hexadecene,
11-phenyl-hexacyclo[6.6.1.1$^{3.6}$.0$^{10.13}$.0$^{2.7}$.0$^{9.14}$]-4-heptadecene, and
14,15-benzo-heptacyclo[8.7.0.1$^{2.9}$.1$^{4.7}$.1$^{11.17}$.0$^{3.8}$.0$^{12.16}$]-5-eicocene.

The glass transition point of the cyclic olefin copolymer (COC) varies depending upon the amount of copolymerized cyclic olefin. In general, those derived from 20 to 50 mol %, preferably from 25 to 48 mol % of cyclic olefin with the balance being ethylene are suitably used.

The molecular weight of the copolymer is not particularly restricted, however, the copolymer preferably has a limiting viscosity [η] determined at 135° C. in decalin of from 0.1 to 5 dl/g.

The above-described copolymer (COC) can be obtained by polymerizing an olefin with a cyclic olefin in the presence of a known vanadium-base catalyst or metallocene-base catalyst.

A suitable copolymer (COC) is commercially available under the trade name of APEL from Mitsui Petrochemical Industries, Ltd.

Other suitable examples of the inner layer material satisfying the above-described conditions include polyesters mainly comprising an ethylene naphthalate unit. The polyester has an ester repeating unit, the major part of which, generally 50 mol % or more, preferably 80 mol % or more, is an ethylene-2,6-naphthalate unit. The polyester has an intrinsic viscosity (IV) determined according to the method described below of 0.55 or more, preferably from 0.60 to 0.75, and a diethylene glycol component (DEG) content of 1.0 wt % or less, preferably from 0.5 to 0.9 wt %.

The ethylene-2,6-naphthalate-base polyester suitably has a glass transition point (Tg) of from 85° to 120° C., preferably from 100° to 120° C., and a melting point (Tm) of from 240° to 270° C., preferably from 250° to 270° C. Homopolyethylene-2,6-naphthalate is suitable in view of heat resistance, but copolymer polyesters containing a small amount of an ester unit other than the ethylene-2,6-naphthalate unit may also be used.

Examples of the dibasic acid other than 2,6-naphthalenedicarboxylic acid include aromatic dicarboxylic acids such as terephthalic acid, isophthalic acid and phthalic acid; alicyclic dicarboxylic acids such as cyclohexanedicarboxylic acid; and aliphatic dicarboxylic acids such as succinic acid, adipic acid, sebacic acid and dodecanedionic acid. These acids may be used individually or in combination of two or more thereof. Examples of the diol component other than ethylene glycol include propylene glycol, 1,4-butanediol, diethylene glycol, 1,6-hexylene glycol, cyclohexanedimethanol and ethylene oxide adduct of bisphenol A, and these may be used individually or in combination of two or more thereof.

The polyester may be used either alone or as a blend with a small amount of another resin such as a nylon, polycarbonate or polyarylate as long as the nature of the polyester is not impaired.

In the present invention, the plastic inner surface material of the container may comprise the above-described cyclic olefin copolymer or polyethylene naphthalate alone, or may be a laminate with another resin layer. In this case the innermost surface is formed of the above-described high glass transition point resin.

The high glass transition point resin layer suitably has a thickness of at least 1μm, preferably 5μm or more, in order to prevent coloring by contents.

Examples of the resin for use in combination with the above-described high glass transition point resin as the inner surface material include an olefin-base resin. The olefin-base resin is preferably an olefin-base homopolymer or copolymer which is commonly used as an inner surface material of a container. Examples thereof include low density polyethylene, medium density polyethylene, high density polyethylene, linear low density polyethylene (LLDPE), polypropylene, polybutene-1, polypentene-1, poly-4-methylpentene-1, a propylene-ethylene copolymer, an ionomer, an ethylene-acryl copolymer and an ethylene-vinyl acetate copolymer. These olefin-base resins may be used either individually or in combination of two or more thereof.

The olefin-base resin suitably has an MFR (melt flow rate) generally of from 0.1 to 50 g/10 min, preferably from 0.2 to 30 g/10 min. MFR is measured in accordance with JIS K 7210-1976: Testing Method for Melt Flow Rate of Thermoplastics.

Intermediate Layer

Various metal foils or gas-barrier resins may be used as the gas barrier intermediate layer for improving the preserving property of a container.

Examples of the metal foil gas barrier intermediate layer include a surface-treated steel foil, a surface-treated iron foil and a light metal foil such as aluminum. Examples of the surface treated steel foil include various steel foils subjected to one or more surface treatments such as zinc plating, tin plating, nickel plating, electrolytic chromic acid treatment, phosphoric acid treatment and chromic acid treatment. Examples of the light metal foil include pure aluminum and aluminum alloy. The metal foil preferably has a thickness of from 3 to 100 μm, more preferably from 5 to 80 μm. A container using metal foil has excellent retort resistance.

The gas barrier resin is most preferably an ethylene-vinyl alcohol copolymer. Examples thereof include a copolymer saponified product obtained by saponifying an ethylene-vinyl acetate copolymer having an ethylene content of from 20 to 60 mol %, preferably from 25 to 50 mol % to have a saponification degree of 96 mol % or more, preferably 99 mol % or more. The ethylene-vinyl alcohol copolymer saponified product should have a molecular weight sufficiently high to form a film and in general, preferably has a viscosity measured at 30° C. in a 85:15 (by weight) mixed solvent of phenol:water of 0.01 dL/g or more, more preferably 0.05 dL/g or more.

Other examples of the gas barrier resin include polyamides having from 5 to 50, preferably from 6 to 20 amide groups per 100 carbon atoms. Examples thereof include semi-aromatic copolyamides such as nylon 6, nylon 6,6, a nylon 6/nylon 6,6 copolymer, metaxylylene adipamide, nylon 6,10, nylon 11, nylon 12, nylon 13, and polyhexamethylene.isophthalamide/terephthalamide. The polyamide has a molecular weight sufficiently high to form a film, and preferably has a relative viscosity (ηrel) measured at 30° C. in concentrated sulfuric acid in a concentration of 1.0 g/dL, of 1.1 or more, more preferably 1.5 or more.

The gas barrier resin layer generally has a thickness of preferably from 5 to 100 μm, more preferably from 10 to 50 μm.

Outer Layer

A heat resistant resin is used as the outer layer of the laminate. Examples thereof include a thermoplastic resin having excellent heat resistance, a thermoplastic resin film having excellent heat resistance and a thermoplastic or thermosetting resin coated film having excellent heat resistance.

Suitable examples of the heat resistant thermoplastic resin include an olefin-base resin, a polyamide resin, a polyester resin, a vinyl chloride resin, a polycarbonate resin, polysulfon, polyphenylene oxide and a cellulose-base resin.

Suitable examples of the resin film include a biaxially stretched polyethylene terephthalate film, a cast, a uniaxially or biaxially stretched polypropylene film and a biaxially stretched nylon film.

Suitable examples of the heat resistant coated film include those comprising a polyimide resin, a polyamidoimide resin, a fluororesin such as polytetrafluoroethylene, a phenol-formaldehyde resin, a furan-formaldehyde resin, a xylene-formaldehyde resin, a ketone-formaldehyde resin, a urea formaldehyde resin, a melamin-formaldehyde resin, an alkyd resin, an unsaturated polyester resin, an epoxy resin, a bismaleimide resin, a triallylcyanurate resin, a thermosetting acrylic resin, a silicone resin or a urethane individually or in combination of two or more thereof. The heat resistant coated film may be a multi-layer coated film consisting of, for example, an undercoat layer and a topcoat layer.

Production of Laminate and Container

In laminating the gas barrier intermediate layer and the inner layer resin or the outer layer resin, in some cases sufficient adhesion may not be achieved therebetween. In that case, an adhesive resin layer is interposed between two layers.

The adhesive resin includes a thermoplastic resin containing a carbonyl (—CO—) group based on a carboxylic acid, a carboxylic acid anhydride, a carboxylate, a carboxylic acid amide or a carboxylic acid ester, in the main chain or the side chain, at a concentration of from 1 to 700 meq (milli-equivalent)/100 g resin, preferably from 10 to 500 meq/100 g resin. Suitable examples of the adhesive resin include an ethylene-acrylic acid copolymer, an ion cross-linking olefin copolymer, a maleic anhydride graft polyethylene, a maleic anhydride graft polypropylene, an acrylic acid graft polyolefin, an ethylene-vinyl acetate copolymer, a copolymer polyester and a copolymer polyamide, and these resins may be used individually or in combination. These resins are useful for forming a laminate by co-extrusion or sandwich lamination. For the adhesive laminate layer between a previously formed gas barrier resin film or metal foil and a humidity resistant resin film, an isocyanate-base or epoxy-base thermosetting adhesive resin may also be used.

The container for use in the present invention has a wall having a thickness in total of from 80 to 600 μm, preferably from 90 to 500 μm, and the thickness ratio of the inner layer:intermediate layer:outer layer is preferably from 1-95:1-30:1-95, more preferably from 3-80:3-20:5-90.

The laminate may be produced using known means, for example, a lamination system such as co-extrusion, dry lamination, sandwich lamination and extrusion coating.

For example, when the oxygen barrier layer is an oxygen barrier resin, the laminate may be produced by a multi-layer co-extrusion method where the resin is melt kneaded in an extruder corresponding to each resin layer and extruded into a predetermined shape through a multi-layer multi-dye such as a T-dye or a circular dye.

Also, a resin film or additionally a metal foil corresponding to each layer are prepared, and these layers may be subjected to dry lamination using an adhesive. Alternatively, an outer layer resin may be coated onto a metal foil or an outer layer film may be bonded by dry lamination to a metal foil as an intermediate layer, and then an inner resin may be provided by sandwich lamination or extrusion coating.

The packaging container such as a cup or a tray can be obtained by subjecting the laminate sheet to vacuum molding, compression air molding, projection molding, plug assist molding, press molding or drawing.

The multi-layer film may be superposed or folded to form a bag that is heat sealed at the outer periphery to produce a bag container (pouch).

Sterilization Packaging

According to the present invention, contents are filled in the above-described packaging container, sealed and then heat-sterilized by hot-water sterilization, hot filling or retort sterilization. In this heat sterilization, even if the contents are colored as curry, the method of the present invention can prevent the resin inner layer from becoming colored.

The sterilization temperature is approximately from 80° to 100° C. in hot-water sterilization, approximately from 70° to 95° C. in hot filling, and approximately from 100° to 135° C. in retort sterilization. Corresponding to the sterilization temperature, an inner surface material having a glass transition point 10° C. or more higher than the sterilization temperature is used. In other words, the sterilization temperature is set to 10° C. or more lower than the glass transition point of the plastic inner surface material of the packaging container. The sterilization time varies depending upon the contents, the sterilization temperature and the degree of disinfection and sterilization, however, in general, it is suitably from 1.5 seconds to 150 minutes.

The present invention is described in greater detail below with reference to the following Examples and Comparative Examples, but the present invention should not be construed as being limited thereto.

Coloring Test Method

Curry was filled and sealed in a container having an inner surface laminated with a plastic film shown in the Table below, and then subjected to heat treatment in an autoclave at 100° C. for 30 minutes.

Method of Measuring Yellow Coloring Intensity

A white plate is used as a standard sample, and the difference in color (YI value and b value) on the container inner surface is measured before and after the heat treatment using an SM Color Computer manufactured by Suga Shikenki KK. The YI and b values are measured in accordance with JIS K 7105-1981: Testing Methods for Optical Properties of Plastics. Thereafter, the difference (Δb, ΔYI) in b values or YI values before and after heat treatment is calculated for each sample according to the following formula:

$$\Delta b = b - b_0$$

b: value after heat treatment, and
$b_0$: value before heat treatment;

$$\Delta YI = YI - YI_0$$

YI: value after heat treatment, and
$YI_0$: value before heat treatment.

| Material | Glass Transition Temperature (°C.) | Difference in Yellow Intensity (Δb) | Difference in Yellow Intensity (ΔYI) |
|---|---|---|---|
| COC (APL6015) | 135 | 0.26 | 0.21 |
| PEN | 120 | 0.55 | 0.77 |
| COC (APL6011) | 105 | 19.6 | 46.0 |
| COC (APL6508) | 70 | 8.4 | 60.0 |
| PET | 70 | 13.0 | 22.4 |
| PP | −10 | 8.0 | 14.0 |

Method of Measuring PEN Intrinsic Viscosity

To 200 ml of a 1:1 (by weight) mixed solvent of phenol:1,1,2,2-tetrachloroethane, 200 mg of each sample is added and dissolved by stirring at a temperature of 170° C. for 20 minutes. Thereafter, the solution viscosity is measured using a constant-temperature water bath at 30° C. by means of a Ubbelohde's viscometer and then converted to intrinsic viscosity.

EXAMPLES 1 AND 2

Polyethylene naphthalate or cyclic olefin copolymer (APL6015 produced by Mitsui Petrochemical Industries, Ltd.) film (thickness: 30 μm) having a glass transition temperature shown in Table 1 and a multi-layer sheet having a layer structure and layer thicknesses shown in Table 2 were subjected to sandwich lamination via an adhesive (MODIC F-3100K, produced by Mitsubishi Chemical Corporation) by an extrusion lamination method. After lamination, the sheet was heated in a vacuum molding machine (manufactured by Yamasaki Kanagata KK) to a sheet surface temperature of 190° C. and then vacuum molded into a container. The innermost surface of the container was a resin film as shown in Table 1, and the container had a content volume of 300 ml and a surface area of 200 cm². Thereafter, curry was filled into the container, sealed and subjected to heat treatment in an autoclave at 100° C. for 30 minutes. The difference in yellow intensity (ΔYI) before and after heat treatment was measured by an SM color Computer manufactured by Suga Shikenki KK and the results thus obtained are shown in Table 3. There was substantially no change in yellow coloring intensity after the heat treatment. Thus, the method of the present invention effectively prevented the resins of Table 1 from becoming colored by the curry.

Comparative Examples 1 to 3

Polyethylene terephthalate and films of two kinds of cyclic olefin copolymers (APL 6011 and APL6508, produced by Mitsui Petrochemical Industries, Ltd.), each was subjected to sandwich lamination with a multi-layer sheet having a layer structure and layer thicknesses as shown in Table 2 in the same manner as in Example 1 or 2. After lamination, the sheet was heat molded into a container. The innermost surface of the container had a resin film as shown in Table 4, and the container had a content volume of 300 ml and a surface area of 200 cm² in the same manner as in Example 1 or 2. Thereafter, curry was filled into the container, sealed and subjected to heat treatment in an autoclave at 100° C. for 30 minutes. The difference in yellow intensity (ΔYI) before and after the heat treatment was measured by an SM color computer manufactured by Suga Shikenki KK and the results thus obtained are shown in Table 5. There was a large change in yellow coloring density after the heat treatment, and the resins of Table 4 were colored yellow by the curry.

TABLE 1

| | Resin | Glass Transition Temperature (°C.) |
|---|---|---|
| Example 1 | polyethylene naphthalate | 119 |
| Example 2 | cyclic olefin copolymer (APL6015) | 135 |

TABLE 2

Structure of Multi-Layer Sheet

| Layer structure | Material | Thickness (μm) |
|---|---|---|
| Inner layer | polypropylene | 370 |
| Adhesive layer | maleic anhydride-modified PP | 15 |
| Barrier layer | ethylene vinyl alcohol copolymer | 30 |
| Adhesive layer | maleic anhydride-modified PP | 15 |
| Outer layer | polypropylene | 370 |

TABLE 3

| | Difference in Yellow Intensity (ΔYI) |
|---|---|
| Example 1 | 0.8 |
| Example 2 | 0.2 |

TABLE 4

| | Resin | Glass Transition Temperature (°C.) |
|---|---|---|
| Comparative Example 1 | polyethylene terephthalate | 70 |
| Comparative Example 2 | cyclic olefin copolymer (APL6011) | 105 |
| Comparative Example 3 | cyclic olefin copolymer (APL6508) | 70 |

TABLE 5

| | Difference in Yellow Intensity (ΔYI) |
|---|---|
| Comparative Example 1 | 22.4 |
| Comparative Example 2 | 46.0 |
| Comparative Example 3 | 60.0 |

Example 3

A film (thickness: 30 μm) of a cyclic olefin copolymer (APL6015, produced by Mitsui Petrochemical Industries, Ltd.) having a glass transition temperature of 135° C. and a coefficient of moisture permeability at 40° C. and 90% RH of 0.09 g.mm/m².24 hr and a multi-layer sheet having a layer structure and layer thicknesses as shown in Table 2 were subjected to sandwich lamination via an adhesive (MODIC F-3100K, produced by Mitsubishi Chemical Corporation) by an extrusion lamination method. After lamination, the sheet was heated in a vacuum molding machine (manufactured by Yamasaki Kanagata KK) to a sheet surface temperature of 190° C. and then vacuum molded into a container. The inner surface of the container was a cyclic olefin copolymer, and the container had a content volume of 300 ml and a surface area of 200 cm². Then, curry was filled into the container, sealed and subjected to retort treatment at 120° C. for 30 minutes. Thereafter, the container with the contents was stored in a thermo-hygrostat at 22° C. and 60% RH for one month. The taste of the curry after storage was sensorially evaluated by 5 panelists through 5 grades of from 1 (bad) to 5 (excellent), taking the taste before retort treatment as 5. The evaluation results are shown in Table 6 below.

Comparative Example 4

A container was molded in the same manner as in Example 3, except for using a film (thickness: 30 μm) of polycarbonate having a glass transition temperature of 150° C. and a coefficient of moisture permeability at 40° C. and 90% RH of 4.0 g.mm/m².24 hr. The contents were filled, sealed, subjected to retort treatment, stored and evaluated for taste in the same manner as in Example 3. The evaluation results are shown in Table 6.

TABLE 6

| Inner Surface Material of Container | Evaluation |
|---|---|
| Cyclic olefin copolymer | 4.6 |
| Polycarbonate | 3.2 |

In accordance with to the present invention, in a packaging process comprising filling and sealing colored contents in a packaging container having an inner surface comprising a plastic material, and then disinfecting and sterilizing the contents by heat treatment, a thermoplastic resin having a glass transition temperature (Tg) 10° C. or more higher than the heat treatment temperature and a coefficient of moisture permeability at 40° C. and 90% RH of 2.0 g.mm/m$^2$.24 hr or less is used as the inner plastic material. The method of the present invention prevents the inner plastic material from becoming colored by the contents and improves the quality of the contents.

While the invention has been described in detail and with reference to specific embodiments thereof, it will be apparent to one skilled in the art that various changes and modifications can be made therein without departing from the spirit and scope thereof.

What is claimed is:

1. A packaging process comprising filling and sealing colored contents in a packaging container having an inner surface comprising a plastic material and then disinfecting and sterilizing the contents by heat treatment, wherein said disinfecting and sterilizing comprises heat treating at a temperature of from 70° to 135° C., said inner surface plastic material comprises a thermoplastic resin having a glass transition temperature (Tg) 10° C. or more higher than the temperature of said heat treatment, a coefficient of moisture permeability at 40° C. and 90% RH of 2.0 g.mm/m$^2$.24 hr or less and wherein said thermoplastic resin comprises a cyclic olefin resin, whereby the thermoplastic resin is prevented from being colored by the contents of the container.

2. The method as claimed in claim 1, wherein said packaging container is in the form of a pouch comprising a heat resistant thermoplastic resin outer layer, a gas barrier intermediate layer and an inner layer comprising said inner surface plastic material.

3. The method as claimed in claim 1, wherein said packaging container is in the form of a rigid or semi-rigid container comprising a heat resistant thermoplastic resin outer layer, a gas barrier intermediate layer and an inner layer comprising said inner surface plastic material.

4. The method as claimed in claim 1, wherein said inner surface plastic material comprises a thermoplastic resin having a coefficient of moisture permeability at 40° C. and 90% RH of 0.10 g.mm/m$^2$.24 hr or less.

5. The method as claimed in claim 1, wherein said cyclic olefin resin has an MFR (melt flow rate) of from 0.1 to 50 g/10 min.

6. The method as claimed in claim 1, wherein the cyclic olefin resin is a copolymer comprising units derived from 20 to 50 mol % of a cyclic olefin with the balance derived from ethylene or α-olefins having from 3 to 20 carbon atoms.

7. The method as claimed in claim 6, where the copolymer has a limiting viscosity [η] determined at 135° C. in decalin of from 0.1 to 5 dl/g.

8. The method as claimed in claim 1, wherein said inner layer plastic material has a thickness of at least 1 μm.

9. The method as claimed in claim 1, wherein said disinfecting and sterilizing is carried out for a time period of from 1.5 seconds to 150 minutes.

* * * * *